United States Patent [19]
Williams

[11] Patent Number: 6,134,419
[45] Date of Patent: Oct. 17, 2000

[54] TRANSMODULATED BROADCAST DELIVERY SYSTEM FOR USE IN MULTIPLE DWELLING UNITS

[75] Inventor: Jim C. Williams, Anaheim, Calif.

[73] Assignee: Hughes Electronics Corporation, El Segundo, Calif.

[21] Appl. No.: 09/009,295

[22] Filed: Jan. 20, 1998

Related U.S. Application Data

[63] Continuation-in-part of application No. 08/787,336, Jan. 27, 1997.

[51] Int. Cl.⁷ ............................... H04H 1/02; H04N 7/10
[52] U.S. Cl. .................... 455/6.2; 348/8; 348/10
[58] Field of Search .................. 455/3.1, 3.2, 4.1, 455/6.1, 6.2, 6.3; 348/6, 8, 10

[56] References Cited

U.S. PATENT DOCUMENTS

| | | | |
|---|---|---|---|
| 3,852,519 | 12/1974 | Court | 178/5.1 |
| 3,882,397 | 5/1975 | Konishi | 325/449 |
| 4,183,054 | 1/1980 | Patisaul et al. | 358/86 |
| 4,318,126 | 3/1982 | Sassler | 358/141 |
| 4,545,075 | 10/1985 | Miller et al. | 155/612 |
| 4,567,523 | 1/1986 | Hiday et al. | 358/191.1 |
| 4,569,084 | 2/1986 | Takahama | 455/131 |
| 4,599,647 | 7/1986 | George et al. | 358/122 |
| 4,608,710 | 8/1986 | Sugiura . | |
| 4,710,956 | 12/1987 | Rast | 380/20 |
| 4,747,160 | 5/1988 | Bossard | 455/33 |
| 4,855,614 | 8/1989 | Maitre | 307/241 |
| 4,916,532 | 4/1990 | Streck et al. | 358/83 |
| 4,959,862 | 9/1990 | Davidov et al. | 380/10 |
| 5,003,591 | 3/1991 | Kauffman et al. | 380/10 |
| 5,012,350 | 4/1991 | Strecke et al. | 358/335 |
| 5,023,931 | 6/1991 | Streck et al. | 455/21 |
| 5,027,430 | 6/1991 | Yamauchi et al. . | |
| 5,045,948 | 9/1991 | Streck et al. | 358/194.1 |
| 5,084,903 | 1/1992 | McNamara et al. | 375/18 |

(List continued on next page.)

FOREIGN PATENT DOCUMENTS

| | | |
|---|---|---|
| 3543229 C1 | of 0000 | Germany . |
| 56-47183 | 4/1981 | Japan . |
| 5-129977 | 5/1993 | Japan . |
| 8-242436 | 3/1995 | Japan . |
| 8-274711 | 3/1995 | Japan . |
| 8-294108 | 4/1995 | Japan . |
| 8-317371 | 5/1995 | Japan . |

OTHER PUBLICATIONS

European Telecommunication Standard, "Digital broadcasting systems for television, sound and data services; Satellite Master Antenna Television (SMATV) distrubution systems," TM 1285 Revision 1, Draft pr ETS 300 473, Nov., 1994, Source: EBU/ETSI JTC, Reference: DE/JTC–DVB–7–1, European Telecommunications Standard Institute, European Broadcasting Union, France, pp. 3–25 (1994).

*Primary Examiner*—John W. Miller
*Attorney, Agent, or Firm*—John A. Crook; Michael W. Sales

[57] ABSTRACT

A system for redistributing a broadband audio-visual-data signal to a multiplicity of receiver units within a multiple dwelling unit (MDU) includes a main receiving antenna that receives a broadband video/audio/data signal having a number of individual program multiplex signals therein and a transmodulator device that transmodulates the individual program multiplex signals associated with the broadband signal from a first modulation scheme to a second modulation scheme to reduce the bandwidth of the broadband signal. The transmodulated signals are broadcast over a cable network, along with terrestrial signals, to individual receiver units at the MDU. The receiver units demodulate the transmodulated and/or terrestrial signals and provide user-specified channels to television sets for display. A dual mode receiver is compatible with the MDU system and with a known digital satellite system commonly used in single family housing (SFH). An adapter enables a standard SFH receiver used in a digital satellite system to be compatible with the MDU system.

9 Claims, 9 Drawing Sheets

U.S. PATENT DOCUMENTS

| | | | |
|---|---|---|---|
| 5,101,499 | 3/1992 | Streck et al. | 455/4 |
| 5,155,591 | 10/1992 | Wachob . | |
| 5,173,775 | 12/1992 | Walker | 358/141 |
| 5,212,824 | 5/1993 | Mishima et al. | 455/188.1 |
| 5,214,501 | 5/1993 | Cavallerano et al. | 358/12 |
| 5,257,396 | 10/1993 | Auld et al. | 455/2 |
| 5,276,904 | 1/1994 | Mutzig et al. . | |
| 5,363,408 | 11/1994 | Paik et al. | 375/39 |
| 5,394,559 | 2/1995 | Hemmie et al. | 455/5.1 |
| 5,412,720 | 5/1995 | Hoarty | 380/15 |
| 5,477,199 | 12/1995 | Montreuil | 332/103 |
| 5,483,663 | 1/1996 | Tawil . | |
| 5,483,686 | 1/1996 | Saka et al. | 455/182.2 |
| 5,497,401 | 3/1996 | Ramaswamy et al. | 375/341 |
| 5,760,819 | 6/1998 | Sklar et al. . | |
| 5,787,335 | 7/1998 | Novak . | |
| 5,790,175 | 8/1998 | Sklar et al. . | |

FIG. 5

| MPEG2 Sync | R-S Sync | Error Flag | Data | | |
|---|---|---|---|---|---|
| 47 | 1D | 94 | 130 Bytes | | |
| 47 | | | 77 Bytes | 1D 94 | 53 Bytes |
| 47 | | | 22 Bytes | 1D 94 | 108 Bytes |
| 47 | | | 99 Bytes | 1D 94 | 31 Bytes |
| 47 | | | 44 Bytes | 1D 94 | 86 Bytes |
| 47 | | | 121 Bytes | 1D 94 | 9 Bytes |
| 47 | | | 66 Bytes | 1D 94 | 64 Bytes |
| 47 | | | 11 Bytes | 1D 94 | 119 Bytes |
| 47 | | | 88 Bytes | 1D 94 | 42 Bytes |
| 47 | | | 33 Bytes | 1D 94 | 97 Bytes |
| 47 | | | 110 Bytes | 1D 94 | 20 Bytes |
| 47 | | | 55 Bytes | 1D 94 | 75 Bytes |
| 47 | | | 130 Bytes | | |

TRANSMODULATED BROADCAST DELIVERY SYSTEM FOR USE IN MULTIPLE DWELLING UNITS

This is a continuation-in-part of application Ser. No. 08/787,336, filed Jan. 27, 1997.

BACKGROUND OF THE INVENTION (a) Field of the Invention

The present invention relates generally to signal distribution systems and, more particularly, to audio/visual/data signal distribution systems that distribute satellite signals typically in conjunction with standard terrestrial and/or cable signals to a plurality of individual receivers within one or more multiple dwelling units.

(b) Description of Related Art

Audio/visual/data (A-V) signal distribution systems generally rely on either a cable network or on free-space propagation for delivering A-V signals, such as television signals, to individual users or subscribers. Cable-based A-V signal distribution systems transmit one or more individual A-V signals or "channels" over wire, while free-space propagation systems transmit one or more channels over-the-air, i.e., in a wireless manner. Most large-scale cable and wireless signal distribution systems broadcast a broadband A-V signal having a plurality of individual A-V signals modulated onto one or more carrier frequencies within a discernable frequency band.

Some wireless signal distribution systems use one or more geosynchronous satellites to broadcast a broadband A-V signal to receiving units within a large geographic area while other wireless systems are land-based, using one or more land-based transmitters to broadcast to individual receiver units within smaller geographic areas or cells. A satellite A-V signal distribution system generally includes an earth station that compiles a number of individual A-V programs into a broadband signal, modulates a carrier frequency band with the broadband signal and then transmits (uplinks) the modulated signal to one or more geosynchronous satellites. The satellites amplify the received signals, shift the signals to different carrier frequency bands and transmit (downlink) the frequency shifted signals to earth for reception at individual receiving units.

The uplink and downlink broadband signals of analog satellite systems are typically divided into a plurality of transponder signals, each typically containing a single analog signal. For example, analog satellite systems operating in the so-called "C-band," i.e., between 3.7 GHz and 4.2 GHz, may broadcast a plurality of transponder signals, each including a single frequency modulated analog T.V. channel. In current digital satellite systems, each transponder typically contains a number of individual channels multiplexed into a single data stream, commonly referred to as a program multiplex. Satellite systems may also broadcast a set of transponder signals at multiple polarizations, for example, at a right-hand circular polarization (RHCP) and at a left-hand circular polarization (LHCP), within the band of carrier frequencies associated with the satellite, effectively doubling the number of channels broadcast by the system.

Satellite signal distribution systems exist for many frequency bands, including the so-called "Ku-band." One known Ku-band direct-to-home satellite system now in operation uses an uplink signal having 16 RHCP transponder signals and 16 LHCP transponder signals modulated onto frequency bands between about 17.2 GHz and about 17.7 GHz. Each of these 32 transponder signals is program-multiplexed to include digital data packets associated with e.g. about five to eight or more individual A-V programs, such as television channels, and is modulated according to a quaternary phase shift keying (QPSK) modulation scheme. The satellites associated with this system shift the uplink transponder signals to carrier frequencies ranging from approximately 12.2 GHz to approximately 12.7 GHz and transmit these frequency-shifted transponder signals back to earth for reception at each of a plurality of individual receiver units.

At the individual receiver units, a receiving antenna, typically comprising a parabolic dish antenna, is pointed in the general direction of the transmitting satellite (or other transmitting location) to receive the broadband QPSK modulated multiplex of A-V signals. Typically, such antennas include a low noise block (LNB) which amplifies, filters and shifts the incoming signal to an intermediate frequency band, such as L-band (between about 1.0 GHz and 2.0 GHz). The representative system, in particular, shifts the satellite signal to the frequency band between about 950 MHz and about 1450 MHz.

Typically, only the RHCP transponder signals or the LHCP transponder signals are mixed down to L-band, depending on which particular A-V channel a user is viewing. However, in systems having a two-channel LNB, both the RHCP and the LHCP transponder signals may be individually shifted down to a 500 MHz portion of L-band (e.g. between 950 MHz and 1450 MHz) and provided, via separate lines, to a set-top box or other integrated receiver and detector (IRD) associated with the receiver unit. At the IRD, an A-V program associated with a particular channel within one of the program-multiplexed transponder signals is decoded and provided to a television or other presentation or processing device for display and/or for processing of transmitted data, audio output, etc. However, because cable lines are inherently frequency limited, typical cables used at receiver sites (such as RG-6 and RG-59) are not capable of simultaneously transmitting all of the received satellite signals (1000 MHz) along with standard CATV signals to the IRD.

Furthermore, the receiving antennas or dishes associated with land-based or satellite-based wireless signal distribution systems are typically large and cumbersome. For example, C-band satellite dishes are generally in the range of four to five feet in diameter and, therefore, require a large amount of operating space. As a result, it can be difficult, if not practically impossible, to install a receiving antenna for each individual unit within a multiple dwelling unit (MDU), such as an apartment, condominium or townhome complex. Reception of a particular satellite signal is made even more difficult in MDUs when, as is generally the case, some of the individual dwelling units therein do not have any walls or outside exposure facing the direction in which the receiving antenna must be pointed, or these dwelling units are shadowed by surrounding buildings or other obstructions.

In the past, these disadvantages have been overcome by placing one or more receiving antennas on, for example, the roof of an MDU and then running cable to each of the individual dwelling units. For example, a system for redistributing a single, off-air signal to multiple buildings in a small geographic area is disclosed in Japanese Patent Document No. 56-47183. However, common L-band multi-user distribution solutions typically used to support single dish antenna systems are fraught with installation and maintenance problems. For example, significant roll-off or degradation of the television signals may occur in cable systems due to the poor high frequency propagation properties of standard cable lines especially at and above L-band. Broadcasting a received broadband A-V signal over an existing cable network at lower carrier frequencies may prevent the use of that network for other A-V signals, such as standard cable, CATV, UHF and VHF television signals, or may require that some of the broadband signals or existing cable signals be eliminated due to the bandwidth restrictions of the cable network.

One system proposed by the European Telecommunications Standards Institute (ETSI) in the area of Satellite Master Antenna Television (SMATV) receives a QPSK modulated satellite television signal (which may be combined with terrestrial TV signals) and remodulates this signal according to a 64 quadrature amplitude modulation (64-QAM) technique. The SMATV system then sends this remodulated signal out over cable to one or more adjacent buildings. Likewise, U.S. Pat. No. 5,173,775 discloses a system that remodulates data portions of a satellite television signal from one modulation scheme to another, such as from FM to AM, for retransmission to subscribers. However, these systems do not specifically demonstrate how to propagate remodulated satellite signals and existing cable or terrestrial signals on the same cable line or other transmission channel in an efficient manner or demonstrate how to remodulate and broadcast a large number of transponder signals associated with one or more satellites over the same cable line or other transmission channel to one or more adjacent buildings.

SUMMARY OF THE INVENTION

The present invention relates to a system and method for distributing a set of program multiplexed A-V signals and existing terrestrial signals to a multiplicity of receiver units within one or more MDUs using an MDU cable network or other transmission channel. According to one aspect of the present invention, a receiving antenna receives a broadband signal from, for example, a satellite or a land-based transmitter. A transmodulator transmodulates the broadband signal into a modulated signal having a bandwidth which is smaller than that of the received broadband signal and transmits this transmodulated signal, typically along with standard terrestrial signals, over a communication channel, such as a cable or a wireless network, to a number of individual receiver units within an MDU. The receiver units demodulate the received transmodulated signal and provide user-specified channels to processing or display units, e.g., video displays, television sets, audio systems, computers, etc.

According to another aspect of the present invention, a signal distribution system that distributes first and second signals over a communication channel to a plurality of individual receivers includes a main receiver and a second receiver disposed at a local site for receiving the first and second signals, respectively. A transmodulator coupled to the main receiver transmodulates the first signal from a first modulation scheme, such as a QPSK modulation scheme, to a second modulation scheme, such as a 128-QAM modulation scheme, to produce a transmodulated third signal. A signal combiner coupled to the second receiver and to the transmodulator combines the transmodulated third signal at a first set of carrier frequency bands and the second signal at a second set of carrier frequency bands to produce a combined signal. A transmitter then transmits the combined signal over a cable or a wireless network in a manner capable of being received at the plurality of individual receivers.

Preferably, the signal combiner includes a control unit that automatically determines the carrier frequency bands associated with the received second signal, locates a continuous frequency band of a predetermined width which is not used by the received second signal, and translates a portion of the transmodulated third signal to the located continuous unused frequency band. If desired, the control unit may translate a portion of the received second signal from one carrier frequency band to another carrier frequency band to produce the continuous unused frequency band of the predetermined width, and may control the transmitter to transmit the second signal at a carrier frequency band which is located between two carrier frequency bands at which portions of the first signal are transmitted.

According to another aspect of the present invention, a signal distribution system distributes a composite signal modulated according to a first modulation scheme over a cable or a wireless network in a manner capable of being received by a plurality of individual receivers at a local site. The composite signal includes a plurality of program multiplex (PM) signals wherein each PM signal includes data related to a number of audio, video, and/or data signals. The signal distribution system includes a main receiver for receiving the composite signal and a plurality of transmodulator channels coupled to the main receiver, each of which transmodulates one of the plurality of PM signals from the first modulation scheme to a second modulation scheme to produce one of a plurality of transmodulated signals. A combiner combines the plurality of transmodulated signals at different carrier frequency bands to produce a combined signal and, thereafter, a transmitter transmits the combined signal over the cable or wireless network in a manner capable of being received by the plurality of individual receivers at the local site.

According to a further aspect of the present invention, a single dual mode IRD unit can be used in an MDU system of this invention and also is compatible with satellite signal distribution systems currently used predominantly in a single family home (SFH). The single dual mode IRD receives the transmodulated signals and demodulates a selected one of the transmodulated signals in an MDU signal distribution system of this invention. The dual mode IRD also is capable of receiving modulated signals in a known SFH satellite signal distribution system and demodulating a selected one of the received modulated signals. In important embodiments, the transmodulated signals and the SFH signals utilize different modulation schemes, and the dual mode IRD is capable of selectively demodulating both such modulation schemes.

Accordingly, apartment dwellers, for instance within a MDU system of this invention, can still use the dual mode IRD of the present invention if they move within a currently available SFH system, and conversely, single family home dwellers can still use the dual mode IRD of the present invention if they move within a MDU system of this invention.

In a still further aspect of this invention, an MDU adapter enables a presently available IRD used within a current signal distribution system for SFHs (SFH IRD), to be compatible with a signal distribution system for MDUs of this invention. The MDU adapter demodulates a selected one of the received MDU network signals and modulates the selected signal in a manner compatible with the SFH IRD.

BRIEF DESCRIPTION OF THE DRAWINGS

FIG. 5 is a data chart illustrating the output of the data packetizer of FIG. 3;

DESCRIPTION OF THE PREFERRED EMBODIMENTS

By the way of example only, the signal distribution system of the present invention is described herein as redistributing a broadband Ku-band satellite signal (comprising up to 32, QPSK-modulated transponder signals transmitted from one or more satellites at a carrier frequency band centered around approximately 12.45 GHz) to receiver units within an MDU. It is understood however, that the signal distribution system of the present invention can be used to redistribute any other type of satellite or land-based wireless signal. The term program multiplex (PM) signal is used herein to describe any single or multiplex of purely visual (such as video), purely audio, or purely data signals as well as a signal comprising any combination of audio, visual, data or other signals including, for example, television signals, digital data signals, etc.

Figure 1:
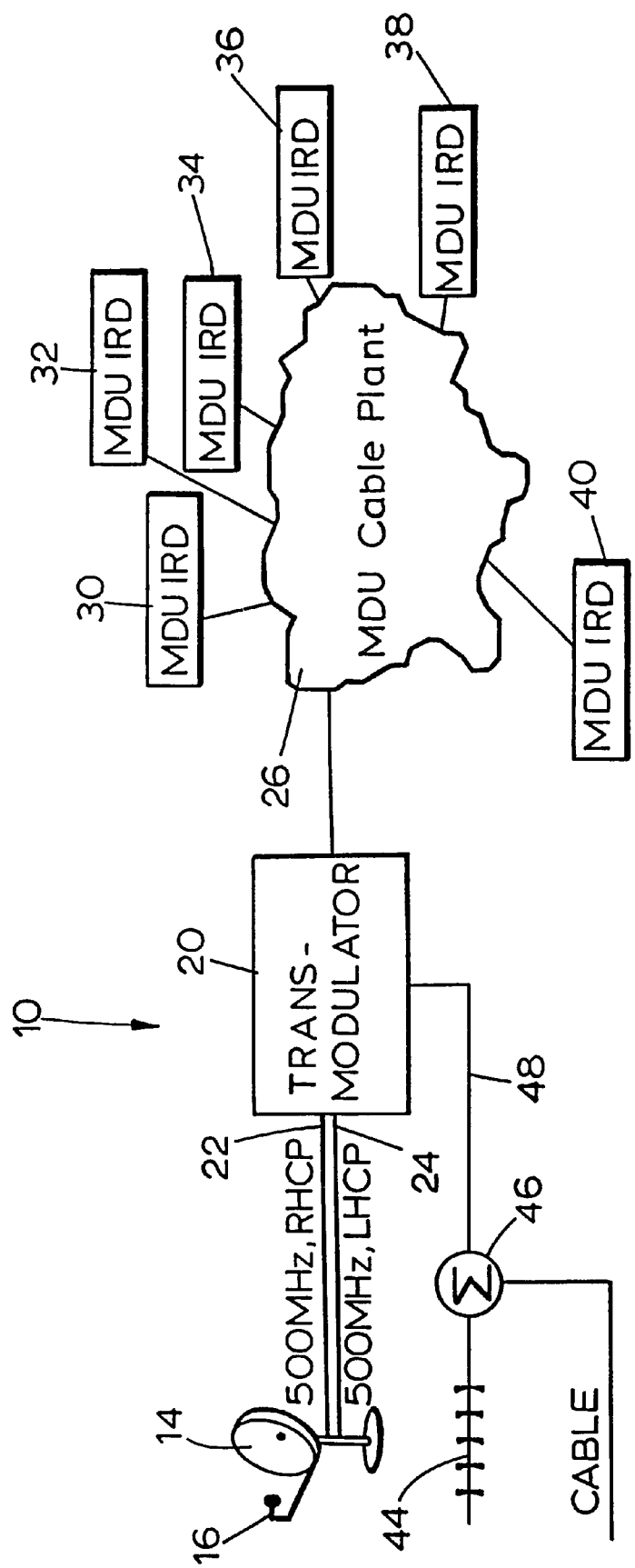
FIG. 1 is a block and partial-schematic diagram of the signal distribution system according to the present invention.

Referring now to FIG. 1, a signal distribution system 10 according to the present invention is illustrated for use at a local site having one or more MDUs and/or other buildings therein. A local site is considered to be any geographic area of relatively small proportion such as, for example, a subdivision, a city block, etc., containing one or more buildings or structures capable of having a plurality of individual receiving units therein. An MDU may be any type of multiple dwelling unit including, for example, an apartment, townhome, or condominium complex, a hotel/motel, an office building, a recreational or sports facility, a cluster of single family homes, a multi-use building and/or any other type of building or structure in which multiple signal receivers may be located.

The signal distribution system 10 includes a main signal receiver 14 disposed on, for example, the roof of an MDU or any other location capable of receiving a signal transmitted by a satellite or other signal source. The signal receiver 14 is preferably in the form of a 24-inch diameter parabolic dish antenna pointed towards, for example, satellites that transmit a Ku-band or other broadband, QPSK-modulated PM signals. A two-channel LNB 16 associated with the dish antenna 14 receives the modulated satellite signal reflected from the dish antenna 14. Each of the channels of the LNB 16 filters either the RHCP or the LHCP component of the received signal and mixes this filtered signal down to an intermediate frequency band, for example, the portion of L-band between 950 MHz and 1450 MHz. The LNB 16 amplifies and provides the 500 MHz, L-band signals associated with each of the RHCP and LHCP components of the downlink signal to a transmodulator 20 via lines 22 and 24, respectively. Other methods for providing the received QPSK input signals to the transmodulator 20 may also be used.

The transmodulator 20 remodulates or transmodulates the signals received from the LNB 16 using an output modulation technique that, preferably, reduces the bandwidth of the signals received from the LNB 16 from two 500 MHz bands (i.e., a total of 1000 MHz) to, for example, a single band of 192 MHz. This reduction in bandwidth may be accomplished by utilizing a more aggressive encoding scheme with appropriate error detection and correction codes. The transmodulator 20 then places the transmodulated, reduced-in-bandwidth signal on a cable plant or cable network 26 within an MDU for distribution to a number of IRDs 30, 32, 34, 36, 38 and 40 associated with individual receiver units spread throughout the MDU. The transmodulator 20 may instead, or in addition, distribute the transmodulated signals over wire or via any wireless communication channel (including, for example, microwave and optical systems) to head-ends at any other MDUs or local sites or portions thereof. Of course, the transmodulator 20 may also distribute the transmodulated signals directly to IRDs using any desired wireless communication channel.

The transmodulator 20 may also receive signals from a cable provider, a local off-air antenna 44, and/or any other desired signal source such as those which locally generate A-V channels (e.g., security camera channels, data networks, or informational channels) using any standard receiving mechanism such as an antenna, modem or cable connection, and places these signals on the cable network 26 for distribution to the IRDs 30–40. These other signals, referred to hereinafter as terrestrial signals, may comprise any cable, satellite or off-air signal including, for example, standard CATV, UHF, VHF, FM radio signals and/or locally generated signals such as security camera or bulletin board channels. The terrestrial signals may be summed or added together in a summing network 46 (which may comprise any standard signal summer) and provided to the transmodulator 20 via a cable line 48, or may be provided separately to the transmodulator 20. The transmodulator 20 may pass the received terrestrial signals to the cable network 26 at the carrier frequencies at which the terrestrial signals are received, or the transmodulator 20 may shift some or all of the terrestrial signals in frequency to use the available frequency spectra of the cable network 26 more efficiently. Where input terrestrial signals are provided in base-band, suitable RF modulators may be used.

Preferably, the transmodulator 20 transmodulates the two 500 MHz-wide QPSK-modulated downlink signals into a 128-QAM-modulated signal having 32, 6 MHz-wide channels, wherein each of the 6 MHz-wide channels corresponds to one of the 32 original transponder signals. The transmodulator 20 may then place each of these 32, 6 MHz-wide, 128-QAM-modulated signals on the cable network 26 at any unused or desired carrier frequency bands while, simultaneously, sending the terrestrial signals over the cable network 26 at any other desired carrier frequency bands. Alternatively, the transmodulator 20 may use any other desired modulation technique to remodulate the received satellite signals. As noted above, the transmodulator 20 may provide the transmodulated signals and/or the terrestrial signals to the IRDs 30–40 over any wireless network, if so desired.

Each of the IRDs 30–40 receives the 32, QAM-modulated, 6 MHz-wide signals along with the terrestrial signals from the cable network 26 (or wireless channel) and demodulates at least a user-selected one of these signals. Each of the IRDs 30–40 then provides the demodulated user-selected signal(s) to an output device or processor, such as a television set (not shown), for display or processing thereby.

Figure 2:
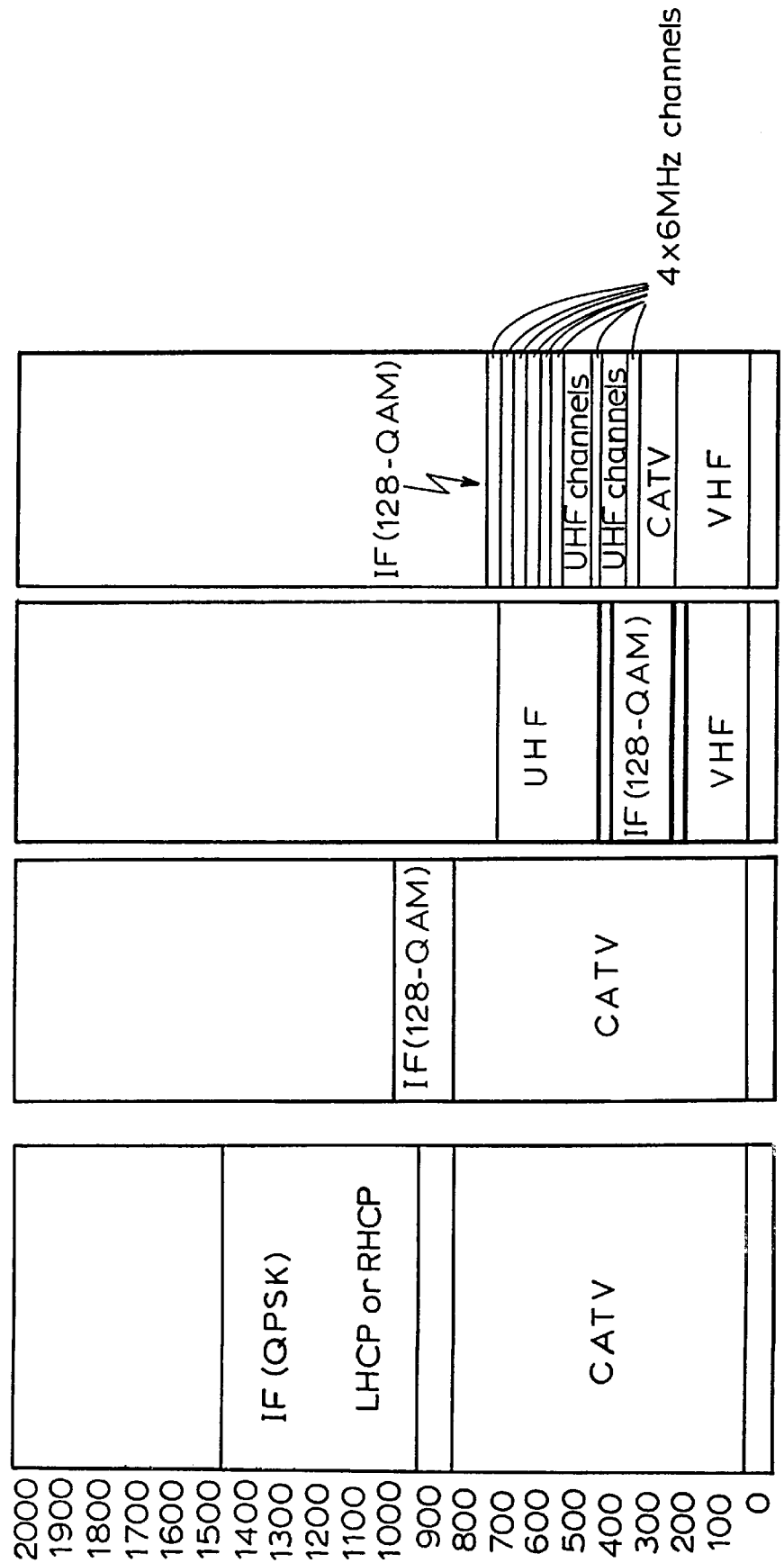
FIG. 2 is a frequency distribution chart illustrating representative options for transmitting received signals along with existing cable and/or off-air signals over a cable network.

Referring now to FIG. 2, representative methods of combining the transmodulated transponder signals along with terrestrial signals on the cable network 26 are illustrated. The left-most column of FIG. 2 illustrates a previously known method of placing QPSK-modulated signals along with terrestrial signals on a cable network. According to this scheme, all existing terrestrial signals (including cable TV signals) are distributed at, for example, VHF and UHF carrier frequencies below 950 MHz while one of the 500 MHz-wide QPSK-modulated signals (associated with either the LHCP or the RHCP component of the satellite signal) is placed directly on the cable network at the unused band between about 950 MHz and 1450 MHz. A major problem with this configuration is that only the RHCP or the LHCP transponder signals can be placed on a standard cable network at any given time which, in turn, prevents IRDs within an MDU from decoding or receiving channels associated with the other of the LHCP or the RHCP transponder signals. While this problem can be overcome by running two cable lines throughout an MDU or by utilizing a high frequency cable plant capable of approximately 2 GHz or greater bandwidth, these solutions require additional equipment and expense and are not adaptable to most existing cable plants now in use. Furthermore, the signals provided at the 950 MHz to 1450 MHz band can be severely degraded by the cable plant due to the poor high frequency propagation properties of many existing cable plants, especially older cable plants.

The three right-most columns of FIG. 2 illustrate methods of combining the 32, 6 MHz-wide, 128-QAM-modulated signals with existing terrestrial signals on the cable network 26. The second left-most column of FIG. 2 illustrates a configuration in which the transmodulator 20 places the 32, 6 MHz-wide, 128-QAM-modulated signals in sequence at a band between about 806 MHz and 998 MHz directly above the common CATV channels. This configuration can be used with higher grade cable networks that propagate signals at up to 1000 MHz without significant degradation.

The third left-most column of FIG. 2 illustrates a configuration in which the transmodulator 20 places the 32, 6 MHz-wide, 128-QAM-modulated signals at a frequency band between approximately 222 MHz and 414 MHz between the CATV or other signals at the VHF and UHF bands. In this case, the transmodulator 20 may need to select which terrestrial (e.g., CATV) signals should be placed in the available portions of the UHF band above about 450 MHz and in the available portions of the VHF band below about 200 MHz and may need to shift some or all of the chosen terrestrial signals to those bands before placing the transmodulated signals on the cable network 26. This frequency distribution technique is useful in lower quality cable systems that propagate signals at frequencies up to about 750 MHz without significant degradation.

The right-most column of FIG. 2 illustrates a configuration in which the transmodulator 20 places the 32, 6 MHz-wide, 128-QAM-modulated signals at a number of different spaced-apart frequency bands within the available cable network spectra. In particular, the transmodulator 20 may break the 32, 6 MHz-wide signals into, for example, eight sets of four, 6 MHz-wide signals and place these eight sets of four signals at the unused carrier frequency bands between about 375–400 MHz, 475–500 MHz and 575–800 MHz, as illustrated in FIG. 2, while sending terrestrial signals at bands between 50–375 MHz, 400–475 MHz and 500–575 MHz. The transmodulator 20 may, however, place these or any other desired groupings of the transmodulated signals at any other desired locations within the available cable network spectra, including at frequency bands normally used by terrestrial signals, based at least in part on how the cable network is being used. In some cases, it may be necessary for the transmodulator 20 to eliminate or frequency-translate some or all of the received terrestrial signals to other frequency bands to avoid interference with the transmodulated signals.

Figure 3:
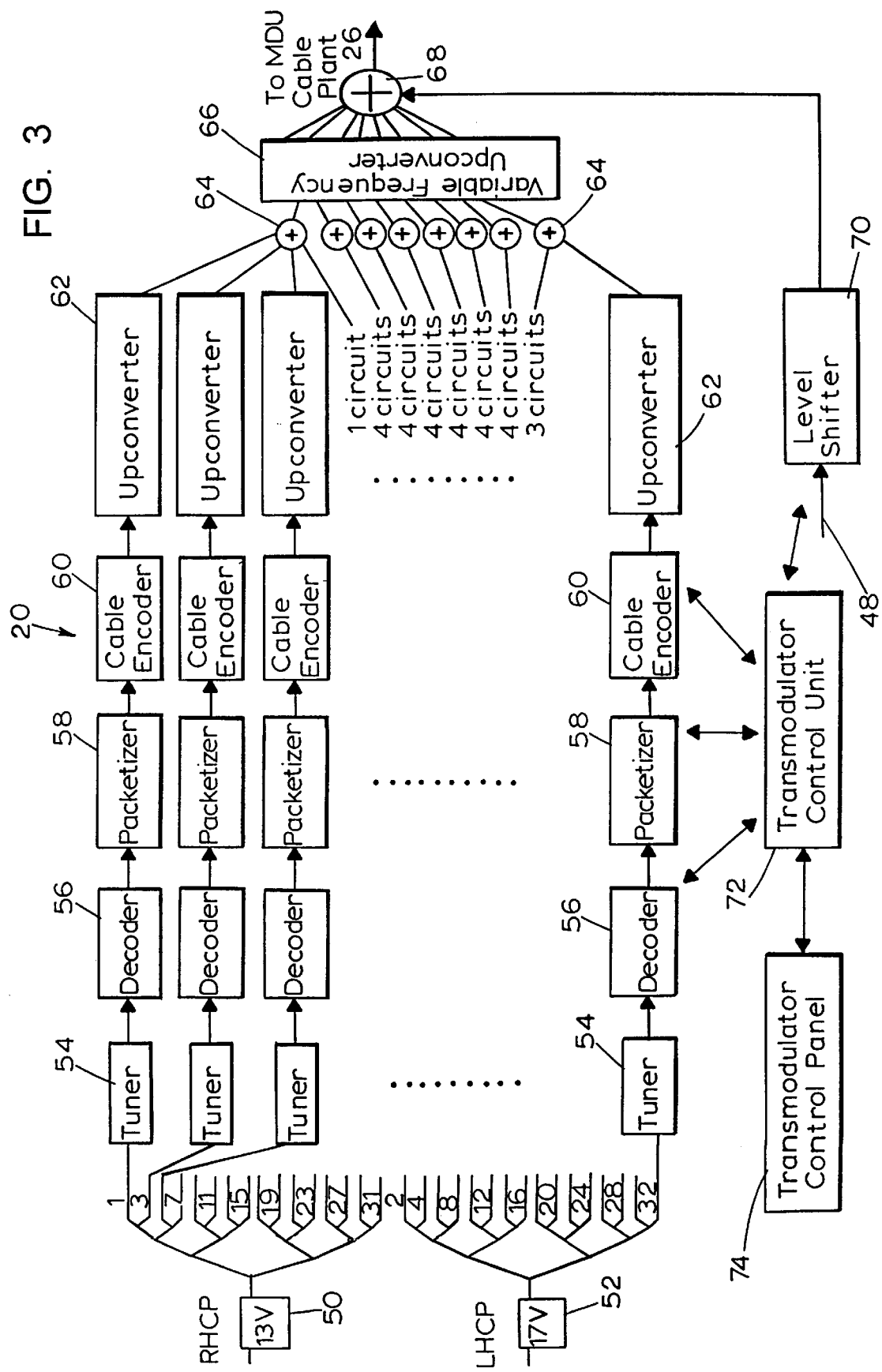
FIG. 3 is a block diagram of an embodiment of the transmodulator of FIG. 1 according to the present invention.

Referring now to FIG. 3, the transmodulator 20 includes bias tees 50 and 52 that receive the RHCP and LHCP QPSK-modulated satellite signals, respectively, at L-band from the LNB 16 (FIG. 1). The bias tee 50 provides a 13 volt DC signal to the LNB channel associated with the RHCP satellite signals, while the bias tee 52 provides a 17 volt DC signal to the LNB channel associated with the LHCP satellite signal. These DC voltages provide power to the respective LNB circuitry and select the desired polarization state in manners well known in the art. In this manner, standard LNBs configured to select polarization states based on the applied DC control voltage may be utilized. Other forms of LNBs permanently configured to operate in desired manners may alternatively be utilized, eliminating the need for the bias tees 50 and 52.

The L-band RHCP and LHCP signals (16 each) are linked to a set of up to 32 transmodulator channels, each of which includes a tuner 54, a satellite decoder 56, a packetizer 58, a cable encoder 60, and an upconverter 62. Each transmodulator channel decodes and transmodulates one of the 32 transponder signals associated with the downlink signal in essentially the same manner and, as a result, the operation of only one of the 32 transmodulator channels will be described herein. It should be understood that a greater or lesser number of transmodulator channels may alternatively be provided.

The tuner 54 of a transmodulator channel tunes to one of the transponder signals associated with either the RHCP or the LHCP signal within the L-band range between 950 and 1450 MHz, while filtering out the other 15 transponder signals within that band, to produce a 24 MHz-wide, QPSK-modulated signal corresponding to one of the 32 satellite transponder signals. If desired, the tuner 54 may shift the tuned 24 MHz-wide, QPSK-modulated signal down to baseband.

The satellite decoder 56 decodes the QPSK-modulated transponder signal in known manners to produce a digital signal having a stream of data packets of programmed-multiplexed data, i.e., a PM signal. In one present DTH system, the packets are 130 bytes in length while, in another common system, the packets are 188 bytes in length. The satellite decoder 56 also provides an indication of whether a non-recoverable error has occurred within each of the, for example, 130 byte data packets during transmission via the satellite, as will be described in more detail hereinafter. Thereafter, the packetizer 58, which may comprise any specialized or general microprocessing circuitry, repacketizes the data packets into another chosen standard. In a particular example, 130 byte packets utilized in the DSS® system standard, may be repacketized into 188 byte digital video broadcasting (DVB) data packets. These 188 byte DVB data packets are then delivered to a standard DVB cable encoder 60 such as a Broadcom Corp. BCM3118 I.C. Of course, if the received satellite signals include 188 byte data packets, the packetizer 58 can be replaced with error detecting circuitry that detects if a transmission error has occurred during transmission from the satellite and encodes an error indication into the 188 byte data packets, such as within the Reed-Solomon error code associated with those packets. Thus, although a repacketizer is preferred in some systems, it should be understood that repacketization is optional, and that other packet sizes and network standards could alternatively be utilized.

The DVB cable encoder 60, which may comprise any known DVB encoder module, modulates the received stream of 188 byte DVB data packets using, preferably, a 128-QAM modulation technique, to produce a 6 MHz-wide transmodulated signal including all of the audio-visual programs associated with one of the 32 original transponder signals. The 6 MHz-wide transmodulated signal developed by the cable encoder 60 is provided to an upconverter 62 which shifts the 6-MHz wide transmodulated signal to an intermediate frequency (IF), preferably comprising one of four different carrier IFs used by the transmodulator 20. The upconverter 62 then provides the IF signal to one of eight summers 64 associated with the transmodulator 20.

In the configuration of FIG. 3, each of the summers 64 receives an input from four of the upconverters 62, each of which upconverts to a different one of the four carrier IFs. Each of the summers 64 combines the four received transmodulated signals to produce, for example, one of the eight groups of four, 6 MHz-wide transmodulated signals illustrated in the right-most column of FIG. 2. The eight summers 64 of FIG. 3 provide eight such groups of four, 6 MHz-wide signals to a variable frequency upconverter 66 which, in turn, upconverts each of the eight groups of four, 6 MHz-wide signals to a different carrier frequency band. A summer 68 then combines these upconverted transmodulated signals with each other and with any desired frequency-shifted or non-frequency-shifted terrestrial signals (delivered by a level shifter 70) for propagation over the cable network 26 of FIG. 1.

The level shifter 70 may receive signals from an off-air antenna, from a cable provider and/or from any other desired signal source (e.g. local security or data services) and pass these signals through to the summer 68 at their current carrier frequency, or may shift these signals to one or more different carrier frequencies for propagation over the cable network 26 using any standard frequency translation or mixer circuitry. Of course, if desired, the level shifter 70 may include circuitry similar to the above-described transmodulator channels and transmodulate one or more of the received terrestrial signals to any desired modulation scheme, such as a 128-QAM scheme, for transmission over the cable network 26. Preferably, such transmodulated terrestrial signals will be transmodulated to the same modulation scheme as the transmodulated satellite signals to simplify decoding of the transmodulated terrestrial signals.

A transmodulator control unit 72, which may be implemented in the form of a microprocessor or any other digital or analog controller, preferably controls the tuners 54, the satellite decoders 56, the packetizers 58, the cable encoders 60, the upconverters 62, the variable frequency upconverter 66 and the level shifter 70 in any desired manner. The control unit 72 may control, for example, tuning parameters, such as the output frequencies of the tuners 54 and may select the frequencies used by the upconverters 62 and 66 and/or the level shifter 70 to control the carrier frequencies at which the transmodulated signals, as well as the terrestrial signals, are transmitted over the cable network 26.

In a preferred embodiment, the transmodulator control unit 72 automatically determines which frequencies to use as carrier frequencies for the 32, 6 MHz-wide transmodulated signals (or other transmodulated signals) developed by each of the 32 transmodulator channels. In this preferred configuration, the transmodulator control unit 72 may include a signal detector (not shown) attached to the line 48 upon which the terrestrial signals are received. At start up or at any other desired time, the signal detector scrolls through or scans the frequency bands between about 54 MHz and 806 MHz (and higher bands if desired) and checks the power lever and/or tries to tune to standard channel locations to determine which channel locations are being used for terrestrial signals. Typically standard terrestrial channel locations are spaced 6 MHz apart. If the signal detector detects enough power and/or is able to tune to a standard channel, e.g., if it tunes to a carrier signal and gets a video sync code, the control unit 72 identifies that the band associated with that channel is being used by a terrestrial (e.g., CATV) signal. However, if the signal detector does not detect sufficient power and/or is unable to tune to any particular channel, the band associated with that channel is identified as an empty band and, therefore, potentially available for use with one or more of the transmodulated signals. The control unit 72 may, instead, include any standard channel or frequency sniffer which locates the frequency bands used by the received terrestrial signals in any other desired manner.

After the control unit 72 identifies all of the empty or unused frequency bands, this information is preferably stored in non-volatile memory. Operator selection (e.g., by means of a keypad) may also be utilized to select or de-select frequency bands, either alone or in conjunction with an automated system.

The control unit 72 may then, in one embodiment, start at the lowest unoccupied band, determine if this band is wide enough to carry one or more, i.e., any desired number, of the 32 transmodulated signals and, if so, identify that band for use by a specific one or more of the transponder signals by changing the output frequency of, for example, the upconverter 66 associated with those transmodulated signals. The control unit 72 may go as high as necessary in frequency to assign carrier frequencies to all 32 of the transmodulated signals.

If the terrestrial signals are spread out throughout the available cable spectra in a manner which makes it impossible or difficult to find empty bands of sufficient predetermined width for all of the desired (e.g., 32) transmodulated signals, the control unit 72 and/or operator input may identify one or more of the terrestrial signals and/or the satellite channels to be eliminated (not provided over the system) or shifted in frequency to thereby produce sufficient regions of continuous spectrum for use by any desired subsets or groupings of the 32 transmodulated signals. In the case in which one or more of the terrestrial signals or the satellite signals are eliminated, the control unit 72 preferably selects the one or more signals for elimination based on a predetermined priority criterion which may be, for example, input by a user or stored in a memory associated with the control unit 72. The priority criterion may prioritize the satellite or terrestrial signals for elimination based on the channel or frequency at which these signals arrive at the transmodulator 20 or based on any other desired criteria.

In the embodiment of FIG. 3, the control unit 72 preferably searches for continuous 24 MHz-wide unused frequency bands within which to place each of the eight groups of four, 6 MHz-wide signals developed by the summers 64. Alternatively, the control unit 72 could search for any smaller or larger continuous band of unused frequencies for use in transmitting any other desired groupings of the 32, 6 MHz-wide transmodulated signals. The control unit 72 may control the level shifter 70 to frequency-translate the terrestrial signals received at the frequency bands identified for use by the transmodulated signals in any conventional manner. Also, the control unit 72 may establish a communication channel with the IRDs 30–40 and signal the location, order, etc. of the transmodulated signals and/or the terrestrial signals to the IRDs 30–40 over this channel.

A transmodulator control panel 74 is coupled to the control unit 72 and, preferably, includes signal strength measurement devices that indicate the relative strength of each of the satellite signals and/or each of the terrestrial signals input to the transmodulator 20. The control panel 74 may also allow an operator to choose default frequency locations for each of the transmodulated and/or terrestrial signals and may include controls that permit an installer to select the carrier frequency bands for any number of the transmodulated and/or terrestrial signals. Of course, the transmodulator control panel 74 and the control unit 72 may perform any other desired functions with respect to the transmodulator 20.

Figure 4:
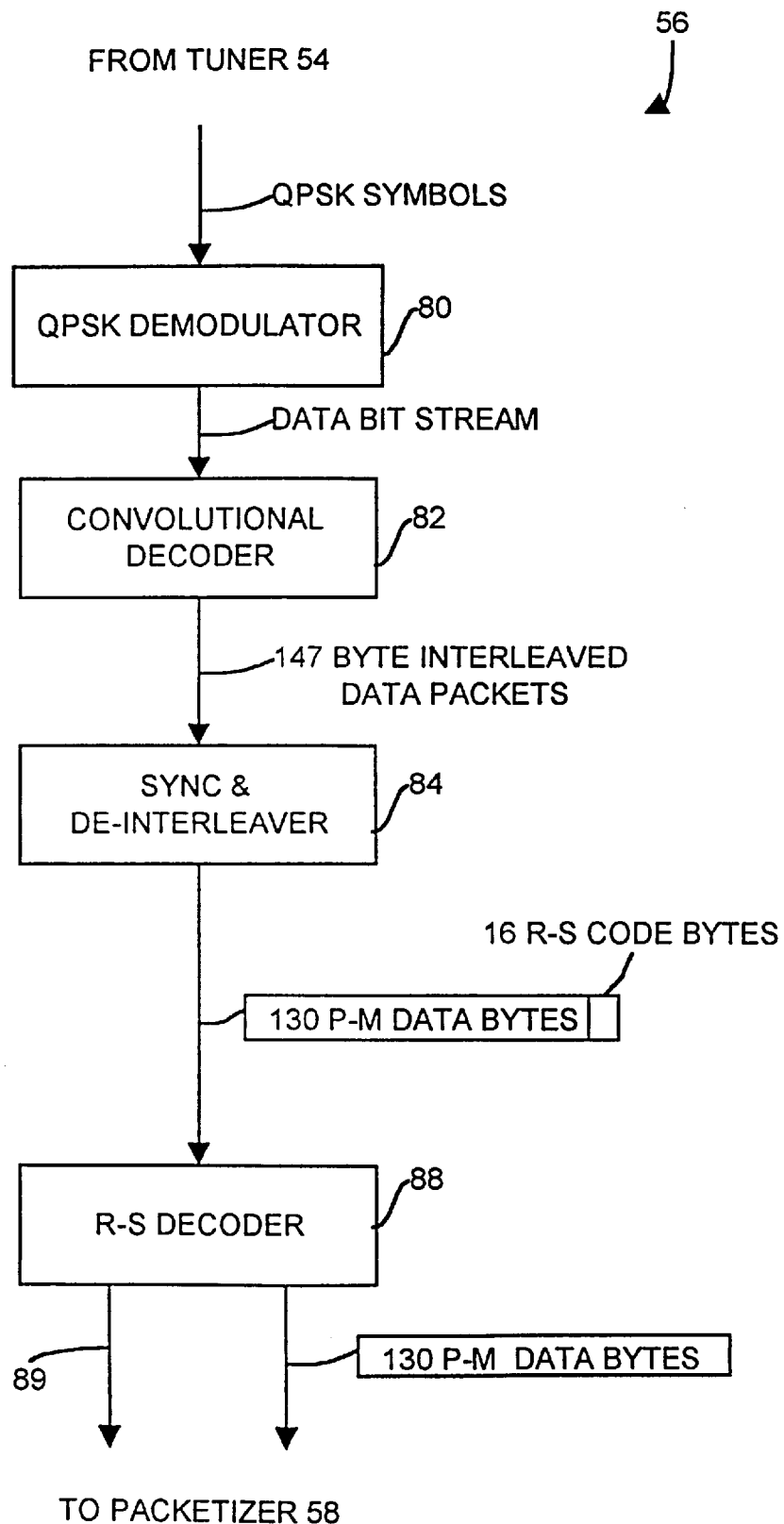
FIG. 4 is a block diagram illustrating the satellite decoder of the transmodulator of FIG. 3.

Referring now to FIG. 4, the satellite decoders 56 of FIG. 3 are described in more detail. Each of the satellite decoders 56 may comprise any standard decoder used in decoding the satellite or other signal received by the main receiving antenna such as the DSS decoder manufactured by SGS Thomson, commonly referred to as the "Link I.C.," the Broadcom Corp. BCM4200 decoder chip, or decoder chips manufactured by LSI Logic and others. Generally, each satellite decoder 56 includes a QPSK demodulator 80 that demodulates the QPSK-modulated signal received from one of the tuners 54. The QPSK demodulator 80 may use any known or desired technique to recognize the incoming QPSK symbols and convert each of these symbols into a soft decision presentation of a two bit pattern (e.g., six bits for each three bit soft decision) based on the phase and absolute magnitude of the symbol. The output of the QPSK demodulator 80 is a digital bit stream comprising a concatenated set of two bit patterns (i.e., the six bit soft decision representation of these patterns) corresponding to the received QPSK symbols.

Because satellite signals are typically convolutionally encoded before being transmitted via satellite (for error correction purposes), the satellite decoder 56 includes a convolutional decoder 82 that convolutionally decodes, using soft decisions if required, the received bit stream in any known manner to produce a stream of 147 byte packets having 146 bytes of interleaved data and one sync byte. A sync and de-interleaver 84 detects and strips the sync byte, and then de-interleaves the remaining 146 bytes to produce a stream of 146 byte data packets, each having 130 bytes of program-multiplexed (PM) data and 16 bytes of Reed-Solomon (R-S) error coding (which was added to the data packets before being transmitted via satellite).

An R-S decoder 88 provides error correction based on the 16 error coded bytes of each of the 146 byte data packets in any known and conventional manner to produce a stream of 130 byte error corrected PM data packets. The R-S decoder 88 also determines if a non-correctable error has occurred to the data within each of the 130 byte data packets and indicates, via a line 89, whether each 130 byte data packet has correct data or, alternatively, has data which has been corrupted by an unrecoverable transmission error.

The packetizer 58 (FIG. 3) receives the 130 byte data packets and the associated error indication and creates therefrom a 132 byte data packet, having 130 bytes of PM data, one sync byte and one, for example, R-S error code byte indicating whether the 130 bytes of data are error-free or whether they contain an uncorrected transmission error. The sync and/or error code bytes can also contain other necessary down-stream information such as command and/or channel configuration information.

The packetizer 58 then concatenates the stream of 132 byte data packets, counts off consecutive sets of 187 bytes to form 187 byte data packets, and adds, for example, a byte having an MPEG2 sync code and/or other downstream information such as command and channel configuration information to the beginning of each of the 187 byte data packets to create a stream of 188 byte data packets. An exemplary stream of twelve such 188 byte data packets is illustrated in FIG. 5, wherein the MPEG2 sync bytes are illustrated as "47" hexadecimal, the sync bytes associated with each of the 130 bytes of data are illustrated as "1D" hexadecimal and the R-S error code or error flag byte associated with each of the 130 bytes of data are illustrated as "94" hexadecimal for the "no error" condition and may be, for example, "95" hexadecimal (not shown) for the error condition. As will be evident from FIG. 5, each of the 132 byte packets having 1 sync byte, 1 error flag byte and 130 bytes of program-multiplexed data can be fully contained within one 188 byte packet or can be split between two 188 byte packets for transmission over the cable network 26. As will also be evident, the pattern of the twelve 188 byte packets of FIG. 5 repeats for every seventeen 130 byte packets.

The packetizer 58 delivers the stream of 188 byte data packets to an associated one of the cable encoders 60. Although the packetizer 58 is described herein as converting from 130 to 188 byte data packets, the packetizer 58 could convert between data packets of any other number of bytes to accommodate other signal decoders, cable encoders, or data organization schemes as desired.

Figure 6:
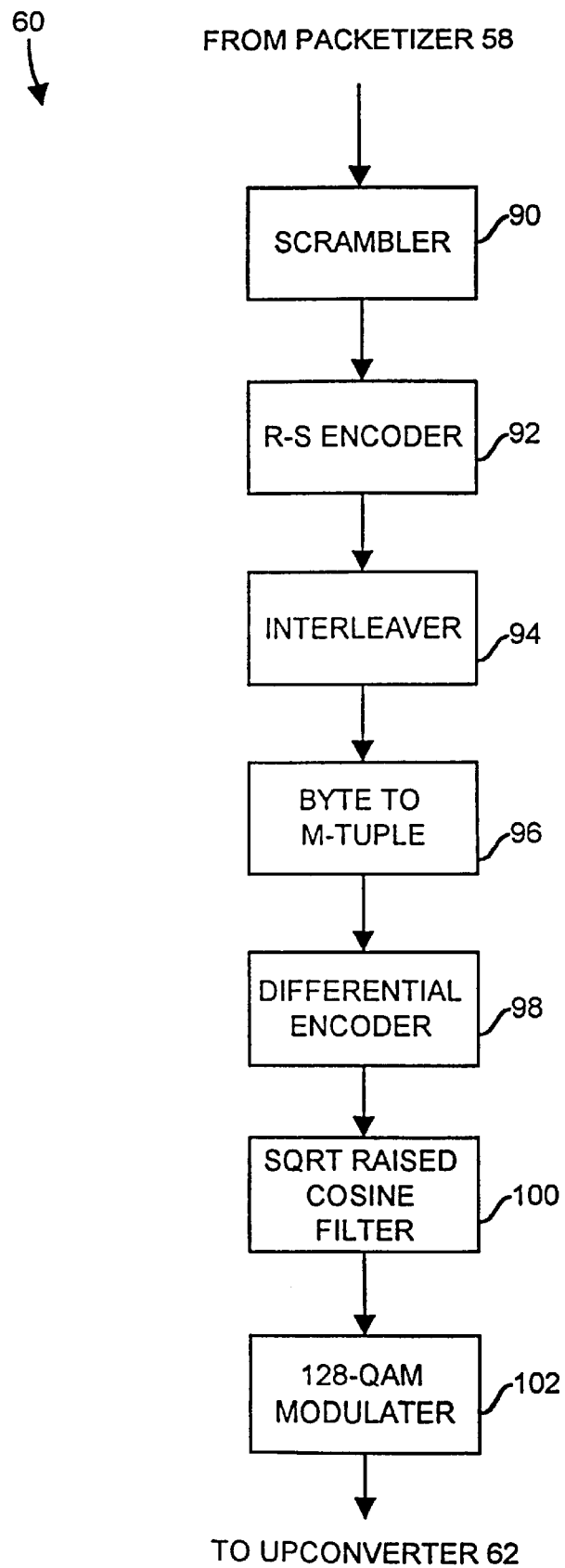
FIG. 6 is a block diagram illustrating an embodiment of the cable encoder of the transmodulator of FIG. 3.

Referring now to FIG. 6, the cable encoders 60 of FIG. 3 are described in more detail. Each cable encoder 60 may comprise any standard DVB cable encoder, such as a DVB encoder of the type manufactured by Broadcom Corp. (the BCM3033 I.C.) which, as is known in the art, operates on 188 byte data packets having 187 bytes of data and one sync byte. Each cable encoder 60 includes a scrambler 90, which randomizes the bits/bytes within each of the 188 byte data packets, and an R-S encoder 92 which adds an R-S error code of, for example, 16 R-S parity bytes, to each of the scrambled 188 byte data packets. Thereafter, a standard interleaver 94 interleaves groups of the R-S encoded data packets for transmission error resistance purposes, as is generally known in the art. A byte to m-tuple encoder 96 splits up the interleaved data packets into consecutive sets of m bits for encoding using a QAM modulation technique. The value of m is a function of the level of QAM modulation being used and, specifically, the QAM modulation technique can be expressed as $2^m$-QAM. Thus, for example, m equals seven in 128-QAM while m equals 4 in 16-QAM.

A differential encoder 98 differentially encodes the two most significant bits of each of the m-tuple bit packets using any commonly known differential encoding technique, as is commonly performed in QAM modulation. Next, a square-root raised cosine filter 100 provides a pulse shaping feature to the differentially encoded bit packets and delivers the shaped pulses to, for example, a 128-QAM modulator 102 which may comprise any standard QAM modulator that produces a 128-QAM modulated signal at the output thereof.

While the transmodulator 20 is described herein as including a packetizer 58 which repacketizes 130 byte data packets produced by a standard DSS satellite decoder 56 into standard 188 byte data packets used by systems following the DVB transmission standard to enable the use of known DSS satellite decoders and known DVB cable encoders, the transmodulator 20 could, instead, include circuitry specifically designed to encode the 130 byte data packets produced by the satellite decoder 56 in a manner similar to the DVB cable encoder, i.e., by scrambling, R-S encoding, interleaving, etc. the 130 byte data packets to produce the 128-QAM modulated signals.

Furthermore, while the signal distribution system 10 is described herein as using a 128-QAM modulator 102, any other type of QAM modulator, such as an 8-QAM, 32-QAM, or higher order QAM modulator can be used to encode the decoded satellite signal, with the choice being dependent on how much frequency spectrum is available on a particular cable system and on how noisy the cable network tends to be which, in turn, drives the level of error protection required. In general, the higher the order of QAM encoding, the less frequency spectrum will be necessary to transmit the desired number (e.g., 32) satellite transponder signals (or other signals) over a cable network. However, the higher the order of QAM modulation, the more the transmodulated signals will be susceptible to noise while being transmitted over a cable network. Likewise, different ones of the transmodulator channels of FIG. 3 may transmodulate the received PM signal, i.e., the tuned transponder signal, using different modulation schemes. For example, a first set of the transmodulator channels may remodulate PM signals using a 128-QAM modulation technique, while a second set of transmodulator channels may use a 32-QAM modulation technique, a 64-QAM modulation technique, and so on. The choice of the modulation technique for any particular transmodulator channel may depend on, for example, the data rate of the PM signal being received, as well as other factors.

Furthermore, as noted above, modulation techniques besides QAM can be used when transmodulating the decoded satellite signal. Other such modulation techniques may include, for example, any high rate digital modulation techniques such as VSB (vestigial side band), including 8-VSB, 16-VSB etc., or QAM with trellis-coded modulation. Other modulation techniques which may be developed in the future could similarly be used without departing from the spirit and scope of the present invention. In general, the choice of a modulation technique will be driven by the reduction in bandwidth which must be accomplished by the modulation technique and by the noise susceptibility of the modulation technique. If a different modulation technique is used, however, it is understood that a different type of cable encoder will be necessary to properly transmodulate the desired transponder signals (or other received signals) for propagation over the cable network 26.

Likewise, it is understood that signals other than QPSK modulated signals can be received at the main signal receiver 14 (or other receiver) and transmodulated for delivery over the cable network 26 using the concepts described herein. In this situation, the particulars of the transmodulator 20 will change based on the type of modulation, carrier frequencies and transmission formats associated with these different received signals. It is considered that the use of an 8-PSK (phase shift keying) modulation scheme for encoding the satellite signal and a 16-QAM or higher order QAM (32-QAM, 64-QAM etc.) scheme for encoding the cable signal may be one useful combination. It is also considered that the use of a 16-QAM scheme for encoding the satellite signal and a 32-QAM or higher order QAM scheme for encoding the cable signal may be another useful combination.

Figure 7:
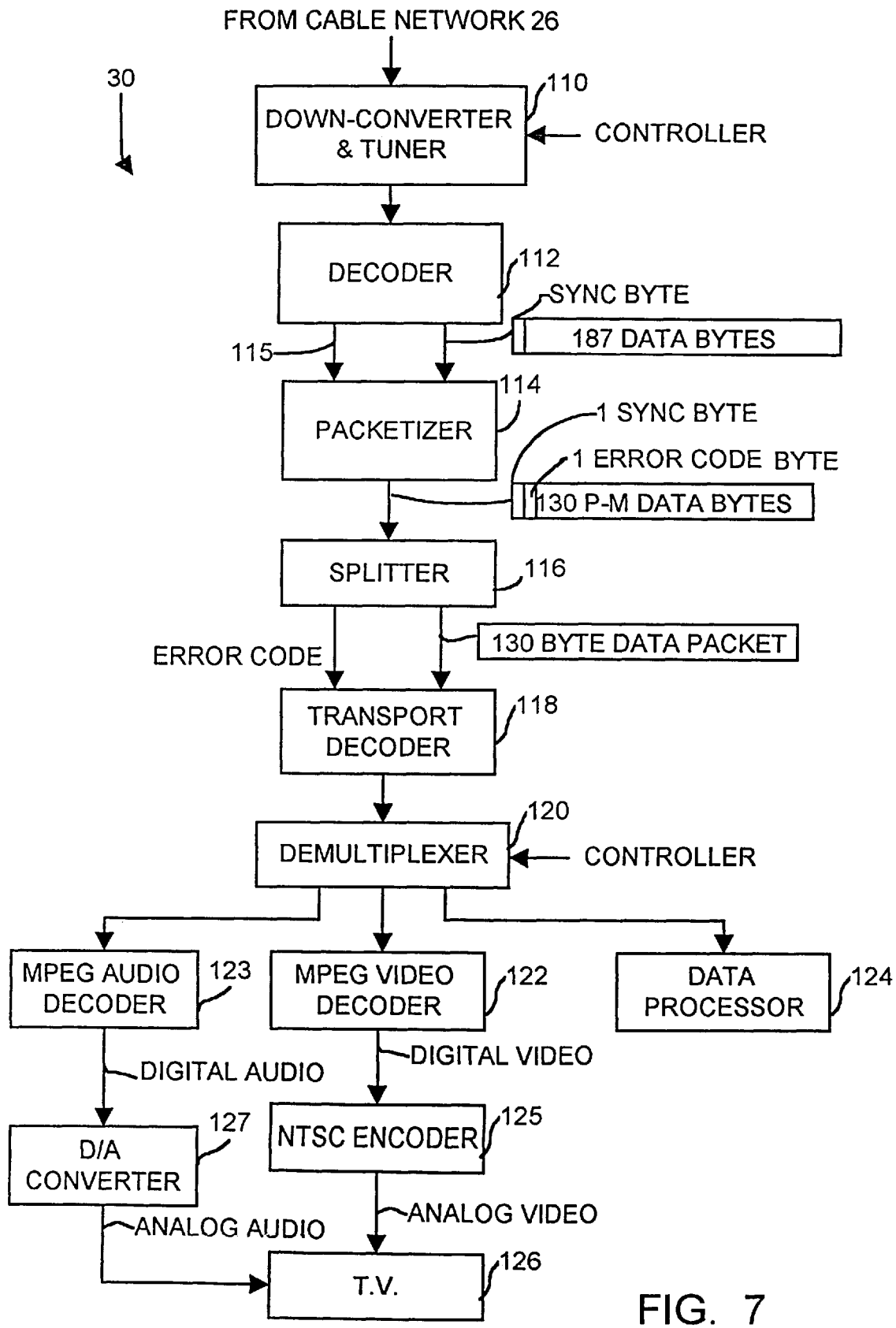
FIG. 7 is a block diagram of an IRD associated with one of the receiver units of FIG. 1.

Referring now to FIG. 7, the circuitry associated with each of the IRDs 30–40, identified hereinafter as IRD 30, is illustrated in block format. While the IRD 30 will be described herein as an IRD which decodes DSS signals, it will be understood by those skilled in the art that the IRD 30 may comprise any other standard circuitry that decodes any other type of modulated or encoded signals.

The IRD 30 may initially scan all the channels from, for example, low carrier frequencies to high carrier frequencies, to locate the frequency bands or channels used by the 32 transmodulated signals and then assign channel numbers to these located signals based on a predetermined ordering scheme used by the transmodulator 20. However, the transmodulator 20 may actively signal the channel locations, ordering, frequency assignments, etc. of the transmodulated satellite signals and/or terrestrial signals via a communication channel established over, for example, the cable network 26. Such a communication channel may comprise a low-speed channel that uses uncoded bits of the sync and error code bytes within the, for example, 188 byte data packets, and may be used to deliver any desired information to the IRD 30 over time, i.e., using a large number of the 188 byte data packets.

The IRD 30 includes a down-converter and tuner 110 connected to the cable network 26. The down-converter is used, if necessary, to shift higher frequency 6 MHz channels to lower frequencies commonly supported by standard tuners. The tuner 110 is responsive to a controller (not shown) and tunes to the frequency band associated with a selected one of the 6 MHz-wide transmodulated signals. The tuned signal is provided to a decoder 112, which may comprise a standard DVB cable decoder such as the BCM3118 decoder chip manufactured by Broadcom Corp. Generally, the decoder 112 includes a 128-QAM demodulator that demodulates the QAM transmodulated signal to produce a set of interleaved, R-S encoded data packets. A de-interleaver de-interleaves the data packets and, thereafter, an R-S decoder strips off the error coding and, to the extent possible, corrects errors resulting from transmission over the cable, to produce a stream of 188 byte data packets. Thereafter a descrambler descrambles each of the 188-byte data packets to remove the effects of the scrambler 90 of FIG. 6. The DVB cable decoder 112 delivers the stream of 188 byte data packets, each having 187 bytes of data and one sync byte, to a packetizer 114 while, simultaneously, providing an indication of whether the data associated with each of the 188 byte data packets has experienced a non-recoverable error during transmission over the cable network 26. This indication may be developed by the R-S decoder of the DVB decoder 112 and provided to the packetizer 114 via, for example, a line 115.

The packetizer 114 strips off the sync byte of each of the 188 byte data packets to produce a stream of 187 byte data packets, concatenates the stream of 187 byte data packets and repacketizes the data stream into a stream of 132 byte data packets, each having 130 bytes of program-multiplexed data, one sync byte and one error code byte. Using the error indication produced by the DVB cable decoder 112 (on line 115), the packetizer 114 determines if a non-recoverable error has occurred with respect to any of the 188 byte packets within which any portion of each 132 byte data packet was included. If so, the error code of the 132 byte data packet is changed to reflect that the 132 byte data packet contains corrupted data.

As a result of this operation, the signal distribution system 10 includes two layers of error coding and is capable of detecting unrecoverable transmission errors which occur during transmission from the satellite base station to the transmodulator 20, and/or from the transmodulator 20 to the IRD 30. In particular, the packetizer 58 (of the transmodulator 20) codes the 132 byte data packets with error information indicating if a transmission error has occurred during the satellite transmission stage of broadcast and packetizes this error code as data within the 188 byte data packets transmitted over the cable network 26. The R-S decoder in the IRD detects if a non-recoverable error has occurred to each of the 188 byte data packets during transmission over the cable network 26 and combines this information with the error code indicated in the error code byte of each 132 byte package to indicate to the later stages of the decoder whether or not each 132 byte packet is correct or contains an error. It should be understood that other packet schemes may similarly be used. For example, if the IRD transport decoder (discussed below) is configured to process, e.g., 188 byte data packets, the error coding function of the packetizer 114 may not be required.

It should be noted that, using the transmodulation and decoding scheme described above, the integrity and security of each PM signal is preserved. That is, the data packets associated with each received PM signal are preserved during the transmodulation and decoding procedures.

The output of the packetizer 114 is provided to a splitter 116 which strips the 130 bytes of program-multiplexed data from the 132 byte data packets using a smoothing buffer to minimize packet-to-packet delay variation or jitter and provides this data to a transport decoder 118. The splitter 116 also decodes the error code associated with each of the 132 byte data packets and indicates to the transport decoder 118 if the 130 bytes of program-multiplexed data at the input thereof have been corrupted during transmission via either the satellite or the cable.

The transport decoder 118, which may comprise any standard transport decoder such as those associated with the DSS system, decodes the program-multiplexed data to produce a stream of digital data. If the presence of an uncorrected error is indicated for any data packet, the transport decoder 118 may use that information to begin known error concealment techniques to reduce the effects of the error when the final signal is, for example, displayed on a television screen. If, however, the error code associated with any particular 130 byte data packet indicates that no transmission error has occurred therein, the transport decoder 118 strips off all data which is not an actual part of the signal to produce a program-multiplexed signal having data associated with from approximately five to eight individual A-V programs, all in known manners.

The program multiplexed data is provided to a demultiplexer 120 which is also responsive to the controller (not shown). The demultiplexer 120, which may be any standard demultiplexer, extracts one of the five to eight A-V programs from the program multiplexed data signal and provides a data stream having data pertaining to the extracted program (as identified by the controller) to a decoder having an MPEG video decoder 122, an MPEG audio decoder 123 and a data processor 124.

The MPEG video decoder 122, which may be any standard MPEG2 video decoder commonly known in the art, operates to produce a digital video signal from the received bit stream and provides this digital signal to an NTSC encoder 125. The NTSC encoder 125, which may be any standard encoder, converts the received digital signal into an analog NTSC video signal and provides this signal to a television set 126 for display on the television screen, as is commonly known in the art. The MPEG audio decoder 123, which may be any standard audio decoder commonly known in the art, produces a digital audio signal from the received bit stream, and provides this audio bit stream to a D/A converter 127 which, in turn, provides an audio signal to the television set 126 for use in conjunction with the video signal developed by the NTSC encoder 125. The data processor 124 performs independent data processing or data functions on data within the decoded signal. The data processor 124 may, for example, decode, display and/or run web pages, software programs, etc. delivered via the satellite communication channel. In addition or in the alternative, other video, audio and/or data signals may be processed or output in known manners. Likewise, terrestrial signals may be diplexed off of the cable network 26 and provided to a tuner associated with a user television, VCR, etc. for demodulation in manners known in the art.

Figure 8:
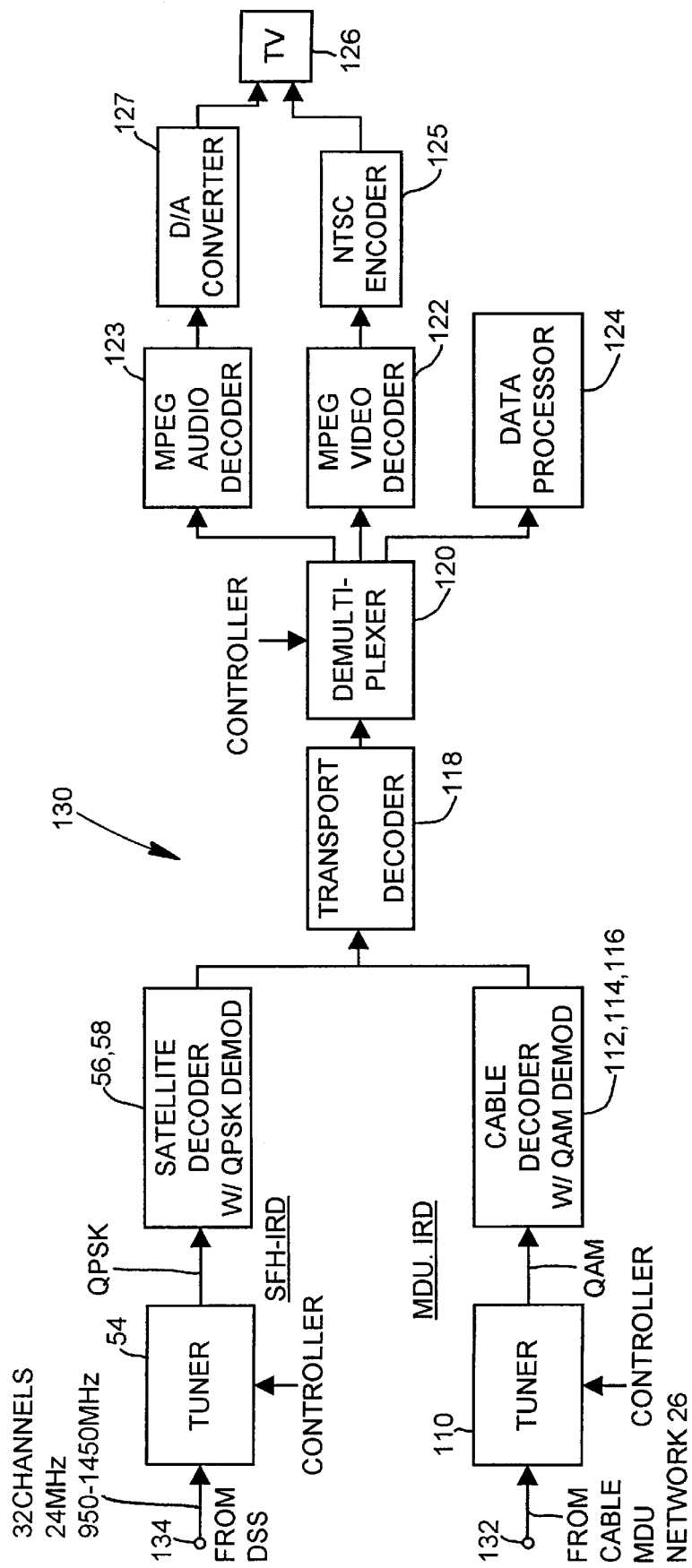
FIG. 8 is a block diagram of a dual mode IRD capable of being one of the receiver units of the MDU system of FIG. 1 and a receiver in a current SFH system.

Referring now to FIG. 8, there is illustrated a dual mode IRD 130 which is capable of use as a MDU IRD 30 within the MDU signal distribution signal 10 of FIG. 1. The dual mode IRD 130 is also capable of receiving signals from a known satellite signal distribution system, such as a DBS system, used predominantly in SFH as will be described later.

In the MDU IRD mode, a first input terminal 132 labeled MDU is provided for coupling the e.g. QAM signals from MDU network 26 (e.g. a cable distribution network) to the same MDU IRD 30 components as shown and described in connection with FIG. 7. Thus, the lower signal path in FIG. 8 labeled MDU IRD illustrates the same components, i.e. tuner 110, decoder 112, packetizer 114, splitter 116, transport decoder 118, and demultiplexer 120 which are provided for processing the received MDU signal from network 26 and providing the illustrated audio, video, and data outputs from the multiplexer 120.

In addition, the dual mode IRD 130 is capable of operating in the SFH IRD mode, and includes a second input terminal 134 for receiving the satellite signal from a known DBS system, e.g. in the frequency band between about 950 MHz and about 1450 MHz. In one preferred embodiment, the satellite signal is in the form of a QPSK modulated multiplex containing 32 communication channels, each about 24 MHz wide. The upper signal path in FIG. 8 labeled SFH IRD includes components for detecting and demodulating the QPSK modulated signals at terminal 134 to provide the 130 bytes of program-multiplexed data, and may also include one sync byte and one error code byte for input to the transport decoder 118 as described previously in connection with FIG. 7. The components for accomplishing this required signal processing include the tuner 54, the decoder and QPSK demodulator 56, and the packetizer 58 as previously described in connection with FIGS. 3, 4 and 5. Video, audio and data outputs are provided as shown in FIG. 8.

In preferred embodiments, the MDU and SFH signals utilize different modulation techniques which may accordingly be optimized to provide the most efficient use of the alternative signal paths (e.g. satellite link vs. MDU cable network). In other embodiments, similar modulation may be used with e.g. different frequency bands. The nature of the difference between the MDU and SFH signals is not limiting, so long as the dial mode IRD 130 is provided with appropriate receiving, demodulation and demultiplexing circuits to allow processing of both types of signals.

Thus, the dual mode IRD 130 is compatible with both a MDU system as shown in FIG. 1 and with a known DBS system used in a SFH, so that a consumer only needs to purchase the single dual mode IRD without regard to whether the consumer may switch dwellings between a MDU and a SFH unit or conversely.

Figure 9:
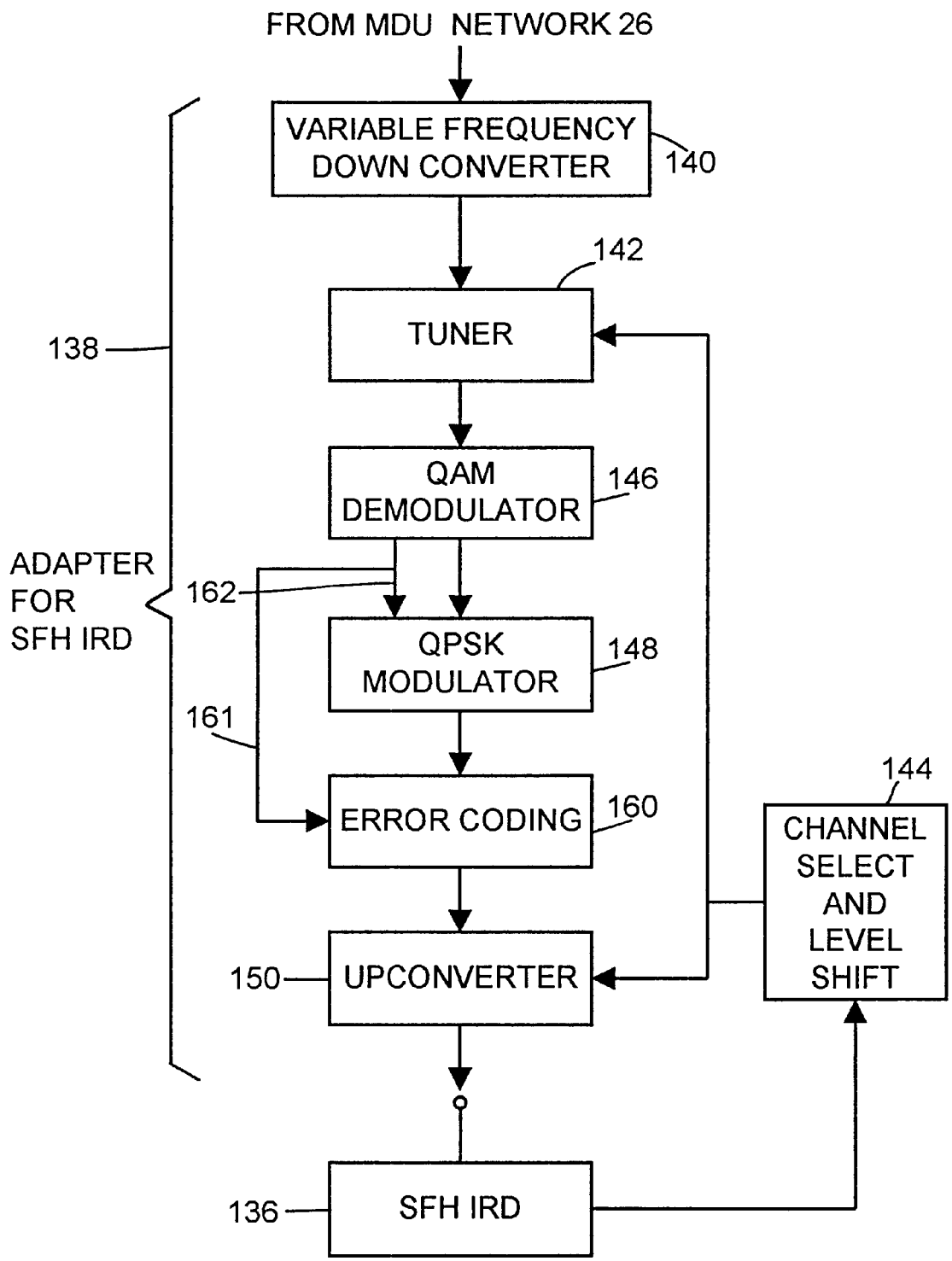
FIG. 9 is a block diagram of an adapter enabling a SFH IRD to be compatible for use within the MDU system of FIG. 1.

Referring now to FIG. 9, there is illustrated a standard SFH IRD unit 136 which is coupled into an adapter unit 138 to enable the SFH IRD 136 to be compatible with the signal distribution system 10 for MDUs, such as shown in FIG. 1. A representative known SFH IRD 136 normally receives RHCP and LHCP QPSK-modulated satellite signals in a DBS system, such as is shown in the input to the tuner 54 in FIG. 3. However, the output of the MDU network 26 to be supplied to the MDU IRD units 30, 32, 34, etc. in FIG. 1 may be an alternative modulation, such as a QAM modulated signal. The adapter 138 therefore receives the QAM modulated signals from the MDU network 26, demodulates these signals and provides retransmitted QPSK modulated signals to the SFH IRD 136.

In particular, in the preferred embodiment of adapter 138, the input QAM modulated signals from the MDU network 26 are coupled to a variable frequency down converter 140 to shift higher frequency 6 MHz channels to lower frequencies commonly supported by standard tuners. The tuner 142 is responsive to a channel select and level shift unit 144 which is a high speed interface determining which channel is being selected, and correspondingly selects an input frequency and a level shift of the output. A QAM demodulator 146 demodulates the QAM modulated signal received from the tuner 142 to provide a corresponding data bit stream to the input of a standard QPSK modulator 148. Modulator 148 then produces a QPSK modulated signal at the output thereof, which is coupled to a standard upconverter 150. The upconverter 150 converts the QPSK modulated signal to the standard intermediate frequency band, for example 950 MHz and 1450 MHz QPSK modulated signals, which are coupled to the SFH IRD 136.

The standard SFH IRDs utilized in known DBS systems typically include response mechanisms for dealing with occasional unrecoverable errors in the received bitstreams. Various techniques are utilized in the broadcast bitstreams to allow error recovery and unrecoverable error detection, such as error coding techniques (e.g. Reed Solomon (R-S) coding). As previously noted, the preferred signal distribution system 10 includes two layers of error coding wherein the data packets are coded with error information indicating if a transmission error ocurred (prior to distribution over the MDU network 26) and with error codes to allow detection of MDU network transmission errors at the receiver (e.g. adapter 138). In the case of the dual mode IRD 130, the MDU mode circuits preferably include the necessary elements to detect and react to both layers of error coding, if present, in manners previously discussed in connection with the dedicated MDU IRD.

In the case of the adapter 130 for use with a standard SFH IRD, it is preferrable to detect both layers of error coding, if present, and pass this information to the attached SFH IRD 136 in a manner that will be recognized by the standard IRD to elicit the appropriate error response. In a preferred embodiment this may be accomplished by detecting errors in the received bitstream as previously discussed, such as within the QAM demodulator 146. If an error id indicated, either in the original reception or in the MDU network distribution, an error coding response is initiated.

For example, an error present message 161 may be supplied to an error coder 160 which acts to modify the affected portions of the output bitstream delivered to the SFH IRD 136 so that the corresponding portions (e.g. blocks or packets) will be recognized as having an unrecoverable error by the SFH IRD's normal error detection circuits. In a preferred embodiment this may be accomplished by forcing the parity indicators of the affected portions to false values that will fail the parity check in the SFH IRD 136. In other embodiments the error message 162 may be delivered to the QPSK modulator 148, which in turn performs the desired error coding in the output bitstream. Other techniques may likewise be employed.

It can be seen that the significant advantage of the adapter 138 is to permit a consumer having a DBS system with the standard SFH IRD 136 to be able to use the same SFH IRD unit in a MDU system such as in FIG. 1. For instance, if the SFH consumer decides to move to an apartment complex, condominium, or other location within a MDU, the consumer can still utilize the SFH IRD 136 unit by adding the adapter 138 which makes the SFH IRD 136 compatible with a MDU system as in FIG. 1. Alternatively, the system operator or others may provide MDU resident subscribers with converters, and the subscriber may then acquire any commercially available standard IRD.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A signal distribution system for distributing a composite signal having a plurality of individual program multiplex signals modulated according to a first modulation scheme therein over a communication channel in a manner capable of being received by a plurality of individual receivers at a local site, the distribution system comprising:

a main receiver disposed at the local site for receiving the composite signal;

a plurality of transmodulator channels coupled to the main receiver, each of which transmodulates one of the plurality of individual program multiplex signals from the first modulation scheme to a second modulation scheme to produce one of a plurality of transmodulated signals;

a combiner coupled to the plurality of transmodulator channels that combines the plurality of transmodulated signals at different carrier frequency bands to produce a combined signal;

a transmitter that transmits the combined signal over the communication channel in a manner capable of being received by the plurality of individual receivers at the local site; and a dual mode reception device coupled to the communication channel at one of the plurality of individual receivers, including (a) means for receiving the combined signal and means for demodulating a selected one of the transmodulated signals within the received combined signal, and (b) means for receiving the composite signal and means for demodulating a selected one of the individual program multiplex signals modulated according to the first modulation scheme to provide video, audio and/or data signals.

2. The signal distribution system of claim 1, wherein the first modulation scheme is a quaternary phase shift keying (QPSK) modulation scheme and the second modulation scheme is a quadrature amplitude modulation (QAM) scheme.

3. A dual mode receiver compatible with (a) a first signal distribution system for distributing a composite signal having a plurality of individual program multiplex signals modulated according to a first modulation scheme therein over a communication channel in a manner capable of being received by a plurality of individual receivers at respective sites remote from each other, and (b) a second signal distribution system transmodulating the individual program multiplex signals from the first modulation scheme to a second modulation scheme and distributing the transmodulated signals over a communication channel in a manner capable of being received by a plurality of individual receivers at a local site, the dual mode receiver comprising:

first means for receiving the composite signal and means for demodulating a selected one of the individual program multiplex signals modulated according to the first modulation scheme to provide first program-multiplexed data;

second means for receiving the transmodulated signals and means for demodulating a selected one of the transmodulated signals to provide second program-multiplexed data; and processing means for processing one of the first and second program-multiplexed data to provide video, audio and/or data signals.

4. The dual mode receiver of claim 3, wherein the first modulation scheme is a quaternary phase shift keying (QPSK) modulation scheme and the second modulation scheme is a quadrature amplitude modulation (QAM) scheme.

5. The dual mode receiver of claim 3, wherein the processing means includes transport decoder means for decoding one of the first and second program-multiplexed data to provide a stream of corresponding digital data.

6. The dual mode receiver of claim 5, including demultiplexer means receiving the stream of corresponding digital data to provide extracted data pertaining to an extracted program from the program-multiplexed data.

7. An adapter for enabling a digital satellite system receiver to be compatible with a signal distribution system which distributes transmodulated signals over a communication channel in a manner capable of being received by a plurality of individual receivers at a local site, the adapter comprising:

means for receiving the transmodulated signals;

means for demodulating a selected one of the transmodulated signals; and means for modulating said demodulated one transmodulated signal in a manner capable of being received by the digital satellite system receiver.

8. The adapter of claim 7, wherein the demodulating means is a quadrature amplitude demodulator and the modulator means is a quaternary phase shift keying modulator.

9. The adapter of claim 7, including means for passing error information from the demodulated received signal to the transmodulated output signal.

* * * * *